US012335266B2

(12) United States Patent
De Santis et al.

(10) Patent No.: US 12,335,266 B2
(45) Date of Patent: Jun. 17, 2025

(54) METHOD FOR GRANTING ACCESS TO OBJECTS IN A COMPUTERIZED SYSTEM, COMPUTER PROGRAM PRODUCT, AND FIELD DEVICE (71) Applicant: Siemens Aktiengesellschaft, Munich (DE)

(72) Inventors: Fabrizio De Santis, Munich (DE); Rainer Falk, Poing (DE); Christian Peter Feist, Munich (DE); Aliza Maftun, Munich (DE); Johannes Zwanzger, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 784 days.

(21) Appl. No.: 17/432,562

(22) PCT Filed: Feb. 18, 2020

(86) PCT No.: PCT/EP2020/054155
§ 371 (c)(1),
(2) Date: Aug. 20, 2021

(87) PCT Pub. No.: WO2020/169555
PCT Pub. Date: Aug. 27, 2020

(65) Prior Publication Data
US 2022/0159004 A1    May 19, 2022

(30) Foreign Application Priority Data
Feb. 22, 2019  (EP) ..................... 19158902

(51) Int. Cl.
*H04L 9/40*    (2022.01)
(52) U.S. Cl.
CPC ............ *H04L 63/101* (2013.01); *H04L 63/08* (2013.01); *H04L 63/102* (2013.01)

(58) Field of Classification Search
None
See application file for complete search history.

(56) References Cited

U.S. PATENT DOCUMENTS 6,279,111 B1    8/2001  Jensenworth et al.
8,826,390 B1 *  9/2014  Varda ................. G06F 21/6218
                                                    726/4

(Continued)

FOREIGN PATENT DOCUMENTS

| CN | 102792313 A | 11/2012 | |
| EP | 0697662 A1 | 2/1996 | |
| EP | 2973184 B1 * | 9/2019 | ............. G06F 21/57 |

OTHER PUBLICATIONS

European Search Report for European Application No. 19158902.7-1218 dated Aug. 9, 2019.

(Continued)

*Primary Examiner* — Jeffrey C Pwu
*Assistant Examiner* — Mayasa A. Shaawat
(74) *Attorney, Agent, or Firm* — Lempia Summerfield Katz LLC (57) ABSTRACT A method for granting access to objects by entities in a computerized system includes: providing an access control list (ACL) specifying for each object access rights to the objects of the computerized system; assigning a capability requirement information to at least one of the objects in the ACL; assigning a capability information to at least one entity of the entities in the computerized system; requesting access to an object by an entity; checking if the requesting entity has an access right in accordance with the ACL; and granting access to the requested object by the requesting entity only when the capability information assigned to the requesting entity matches with the capability requirement information assigned to the requested object. The combina- (Continued)

tion of an ACL based access to files with capabilities improves the security of the system.

17 Claims, 3 Drawing Sheets

(56) References Cited

U.S. PATENT DOCUMENTS

| | | |
|---|---|---|
| 2010/0218238 A1 | 8/2010 | Mouleswaran |
| 2011/0222099 A1* | 9/2011 | Mori .................... G06F 3/1219 |
| | | 358/1.14 |
| 2011/0231940 A1 | 9/2011 | Perumal |
| 2015/0310426 A1* | 10/2015 | Samid .................... G06Q 20/04 |
| | | 705/69 |
| 2015/0339492 A1* | 11/2015 | Mizhen .................. G06F 21/62 |
| | | 726/26 |
| 2016/0203327 A1 | 7/2016 | Akkiraju |
| 2019/0253427 A1* | 8/2019 | Kling .................... G06F 3/0622 |

OTHER PUBLICATIONS

Mayer Frank: "SELinux by Example", Prentice Hall, XP002793199, ISBN: 0-13-196369-4; pp. 16-22,; 2007.
PCT International Search Report and Written Opinion of International Searching Authority mailed May 7, 2020 corresponding to PCT International Application No. PCT/EP2020/054155.
Sandhu, Ravi S., and Pierangela Samarati. "Access control: principle and practice." IEEE communications magazine 32.9 (1994): 40-48.

\* cited by examiner

METHOD FOR GRANTING ACCESS TO OBJECTS IN A COMPUTERIZED SYSTEM, COMPUTER PROGRAM PRODUCT, AND FIELD DEVICE

The present patent document is a § 371 nationalization of PCT Application Serial No. PCT/EP2020/054155, filed Feb. 18, 2020, designating the United States, which is hereby incorporated by reference, and this patent document also claims the benefit of European Patent Application No. 19158902.7, filed Feb. 22, 2019, which is also hereby incorporated by reference.

TECHNICAL FIELD

This disclosure relates to a method for granting access to objects, such as files or processes, in a computerized system, e.g., an automation system. The disclosure further relates to a field device in an automation system.

BACKGROUND

Granting access to objects in computerized systems, such as industrial automation or control systems, needs to be safe and secure. Granting or denying access to files, interfaces, or functions in devices involved in automation systems is one key measure to improve the integrity of the respective automation system.

Automation systems may run operating systems on the controllers involved. Conventional operating systems, for example, use access control methods for resources of the operating systems, as for example files, in terms of an access control list (ACL). For example, an access control list (ACL) stipulates if an access to a file is allowed or not for certain users. Conventional operating systems, (such as Linux®, UNIX®, BSD, Windows®, or MacOS®) all use an ACL model.

The administration of access rights may be based on discretionary access control (DAC) models, where users may define access rights to objects which they own in the system. In a mandatory access control (MAC) system, access rights are defined for the entire system and cannot be altered by the users. ACL, DAC, or MAC models may not be sufficient and flexible enough for industrial applications, as for example, in computerized automation systems.

SUMMARY AND DESCRIPTION

It is therefore an object of the present disclosure to provide an improved method for granting access to objects in a computerized system.

The scope of the present disclosure is defined solely by the appended claims and is not affected to any degree by the statements within this summary. The present embodiments may obviate one or more of the drawbacks or limitations in the related art.

According to one aspect of this disclosure, a method for granting access to objects by entities in a computerized system includes: providing an access control list (ACL) specifying for each object access rights to the objects of the computerized system; assigning a capability requirement information to at least one of the objects in an access control list; assigning a capability information to at least one entity of the entities of the computerized system; requesting access to an object by an entity; checking if the requesting entity has an access right in accordance with the ACL; and granting access to the requested object by the requesting entity only when the capability information assigned to the requesting entity matches with the capability requirement information assigned to the questioned object.

The term "entity" in a computerized system is used as a designation for the subject requesting an access to a particular object in the system. It is further understood that "matching" is to be construed as being in compliance or accordance with each other. Hence, the capability requirement information specifies what capability the requesting entity must have to access the requested object.

The computerized system may be a distributed system including communicatively coupled devices. The proposed method for granting access combines conventional ACL-based access control methods with an additional capability-based verification of the capability assigned to the subjects, e.g., the requesting entities. The capability requirement information indicates that for accessing the requested object particular capabilities that may be defined by the capability information is necessary. In particular, in automation systems or industrial networks, the capability-based additional verification may be easily implemented. In particular, regarding security relevant accesses, ACL in combination with capability checking may be implemented to improve security.

In certain embodiments of the method, the at least one object is a file, interface, component, service, and/or a registry entry of an operating system. For example, a file may be stored in terms of a file system according to the operation system. An interface may be a network interface, or an input/output interface connectable to a sensor or actuator. A component of the computerized system may be a power management unit, a watchdog component, or an integrated real-time clock. In certain embodiments, access to an interface is implemented through a file access in a file system. A service may be a software service allowing or implementing certain actions in the computerized system.

In certain embodiments of the method, at least one entity is a user or a process. In methods for operating a computerized system, processes, (such as read or write operations) are not only documented in terms of the ACL but have their assigned capabilities in terms of the capability information. The same holds for users or user IDs that are indicative of a certain identity, to which capability information is assigned.

In certain embodiments, the capability requirement information is a data flag in the ACL indicating that a capability requirement is to be checked prior to granting access. The capability requirement information may be a capability requirement data entry (CRDE) and/or a pointer to a capability requirement data entry.

A data flag, for example, indicates that, in addition to a successful ACL check, a capability check needs to be performed before granting access to the object so that the requesting entity may access the object. The flag or CRDE may be stored in terms of a file header, a file attribute, a file name, or a file name extension. In particular, if the object is a file in a file system, the CRDE may be explicitly or implicitly included into the file name. For example, a file name extension, (e.g., self-check.execap), may indicate that this file may only be accessed if the specific capability is proven. One may also contemplate including the CRDE directly into the file header, (e.g., the first eight or sixteen bytes of a file to be stored).

In certain embodiments, the CRDE may be part of a file attribute which may be metadata associated with the respective computer file. Conventional operating systems already provide for file attributes so that an additional capability attribute may be added. This also includes filesystem-specific fields, such as extended attributes, which may be used to store the CRDE.

In certain embodiments, the CRDE is stored in a database separate from the ACL. One may contemplate a trusted hardware module, a secure element, and/or a cryptographically protected element in the computerized system.

In certain embodiments of the method, the capability information is an entry in a capability table including identifiers for the entities and assigned capability data entries CDE. The capability table may be stored in a capability configuration file. One may also contemplate storing the capability table using a hardware security module or a security dongle.

In certain embodiments, a kernel-level component such as a Linux security module is used to store the capability table. For example, usernames or user IDs may serve as identifiers for the entities, if users are considered access requesting entities. Alternatively, or additionally, process IDs may be used as identifiers when processes need to access certain files managed by the respective operating system implementing aspects of the proposed method.

One may contemplate storing the capability table as part of the user database.

In certain embodiments, the CDEs are assigned to each user or to user groups. The CRDE may be included to attributes of binary files, e.g., files containing program code or files pertaining to a program code library. The attributes may define the properties of the capability data entries required to access and execute the program code in the files.

In some embodiments, processes running under the operating system are the requesting entities. Then, processes may have an assigned capability data entry that may be transferred to consequential processes (e.g., daughter processes) so that a capability may be inherited from one process to another.

Checking or verifying if the capability information matches with the capability requirement for a particular process may include a request for external credentials, for example, retrieving additional capability or security data from a server or from dedicated hardware security modules.

In certain embodiments, the CRDE includes a verification data entry VDE for verifying a CDE, wherein the CDE in particular includes a cryptographic check sum calculated as a function of data indicative of the entity's identity.

In certain embodiments verifying the CDE is executed using a separate secure element. An operating system that implements the proposed method may generate a dedicated capability memory section for users. Such a dedicated capability memory section may be used as a capability whiteboard where users may store their capability entries safely.

For example, the computerized system may include an industrial PC, field devices, and/or controller devices that operate according to an operating system. When booting the computerized system, the capability information may be stored as a function of a random variable. Thus, the dedicated capability memory section changes its appearance each time the system is started which improves security.

Verifying the CDE may include an identity check, e.g., if the CDE in terms of a sequence of bits is identical with the required sequence of bits in the respective CRDE the CDE and CRDE match with each other. For example, the sequence of bits may be of length 32, 64, 128, 256, or 512 bit. The bits may be randomly chosen, so that a valid CDE cannot be guessed practically. This provides a high level of protection.

If the CDE includes a cryptographic check sum derived from identity data of the requesting entity, (e.g., a username or a user ID), an effective access control may be implemented. Verifying may be executed through a kernel component or a secure element, (e.g., TrustZone, TEE, HSM, or a CryptoController). Verifying a CDE externally is particular advantageous when the requesting entity includes a process for updating or relating to the firmware of the computerized system.

In certain embodiments, the CDE may further require an interaction with the user. For example, an object-specific password or an identification of the user in terms of a hardware token may be additionally confirmed.

In certain embodiments, the CDE has a limited period of validity. For example, the validity may be restricted to a certain period of time. Also, a CDE may only be used for accessing objects a certain number of times. One-time validities for access control to very security-relevant accesses may be configured. Also, the CDE may only be used under certain global conditions of the operating system or device, e.g., the presence of a certain USB-device or if an external tamper switch indicates that the device is still intact.

In certain embodiments, the CDE is changed as a function of its use. For example, a CDE may initially allow for a certain reconfiguration process during a boot phase. However, during regular operation of the computerized system, such reconfigurations are no longer allowed. The capability is removed after a one-time deployment.

According to another aspect of this disclosure, a field device for an automation system including a processing device and a memory device for storing objects is disclosed. The processing device is configured to execute a method for accessing the objects by an entity according to the aspects disclosed above or in the following. For example, the field device may include a memory device that includes a file system, and the objects are filed in the file system.

The field device may include a separate memory device or section for storing and/or checking the capability information.

The field device may further include a secure element for performing specific security functions. For example, specific hardware features of the field device are only granted if the requesting party or object may provide matching capability information.

Implementing the proposed method has the advantage that a robust protection against attacks to hardware components may be easily implemented. This is because the combination of ACL access control and the additional capability check leads to improved hardware security and may be added to access control mechanisms of conventional operating systems.

The respective entity, (e.g., the processing device), may be implemented in hardware and/or in software. If the entity is implemented in hardware, it may be embodied as a device, (e.g., as a computer or as a processor or as a part of a system such as a computer system). If the entity is implemented in software it may be embodied as a computer program product, a function, a routine, a program code, or an executable object. Virtualized devices are also possible.

According to a further aspect, the disclosure relates to a computer program product including a program code for executing the above-described method when run on at least one computer or processing device.

A computer program product, such as a computer program means, may be embodied as a memory card, USB stick, CD-ROM, DVD, or as a file which may be downloaded from a server in a network. For example, such a file may be provided by transferring the file including the computer program product from a wireless communication network.

The aspects and features described with reference to the field device apply mutatis mutandis to the method for granting access.

Further possible implementations or alternative solutions of the access granting method also encompass combinations—that are not explicitly mentioned herein—of features described above or below with regard to the embodiments. The person skilled in the art may also add individual or isolated aspects and features to the most basic form of the disclosure.

BRIEF DESCRIPTION OF THE DRAWINGS

Further embodiments, features, and advantages of the present disclosure will become apparent from the subsequent description and claims, taken in conjunction with the accompanying drawings, in which:

In the Figures, like reference numerals designate like or functionally equivalent elements, unless otherwise indicated.

DETAILED DESCRIPTION

Figure 1:
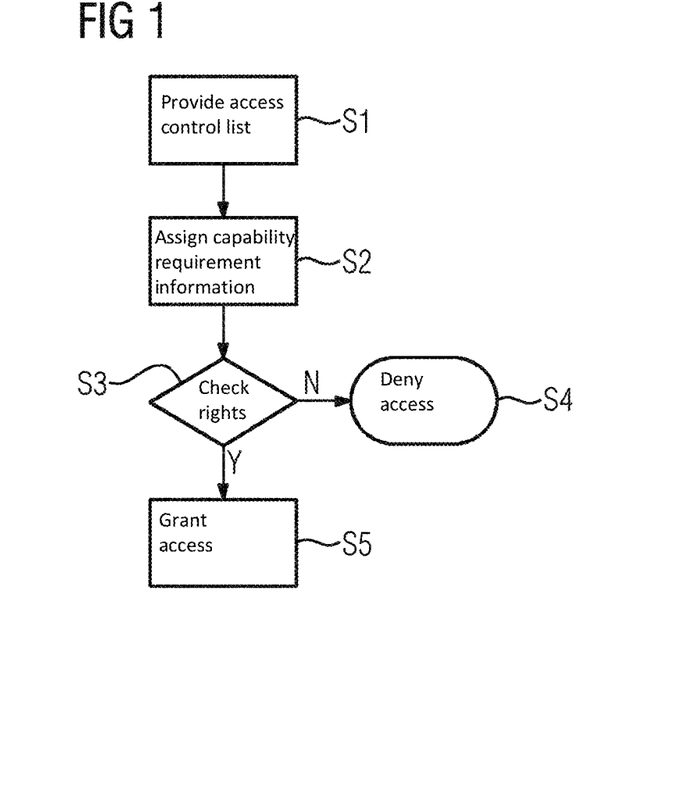
FIG. 1 shows a process flow including method acts involved in an embodiment of a method for granting access to objects in a computerized system.

FIG. 1 shows a process flow including method acts involved in an embodiment of a method for granting access to objects in a computerized system. The computerized system includes, for example, objects in terms of files. The objects are to be accessed by entities, such as users. If a user wants to access a certain file, the operating system granting or denying access to the file performs an ACL-based check. Additionally, the user has to provide a certain capability for accessing the file. Which capability has to be provided is defined by the ACL. Only if both requirements are fulfilled, ACL compliance and a matching capability with a required capability for accessing the file, the user may access the file and respective data.

Figure 4:
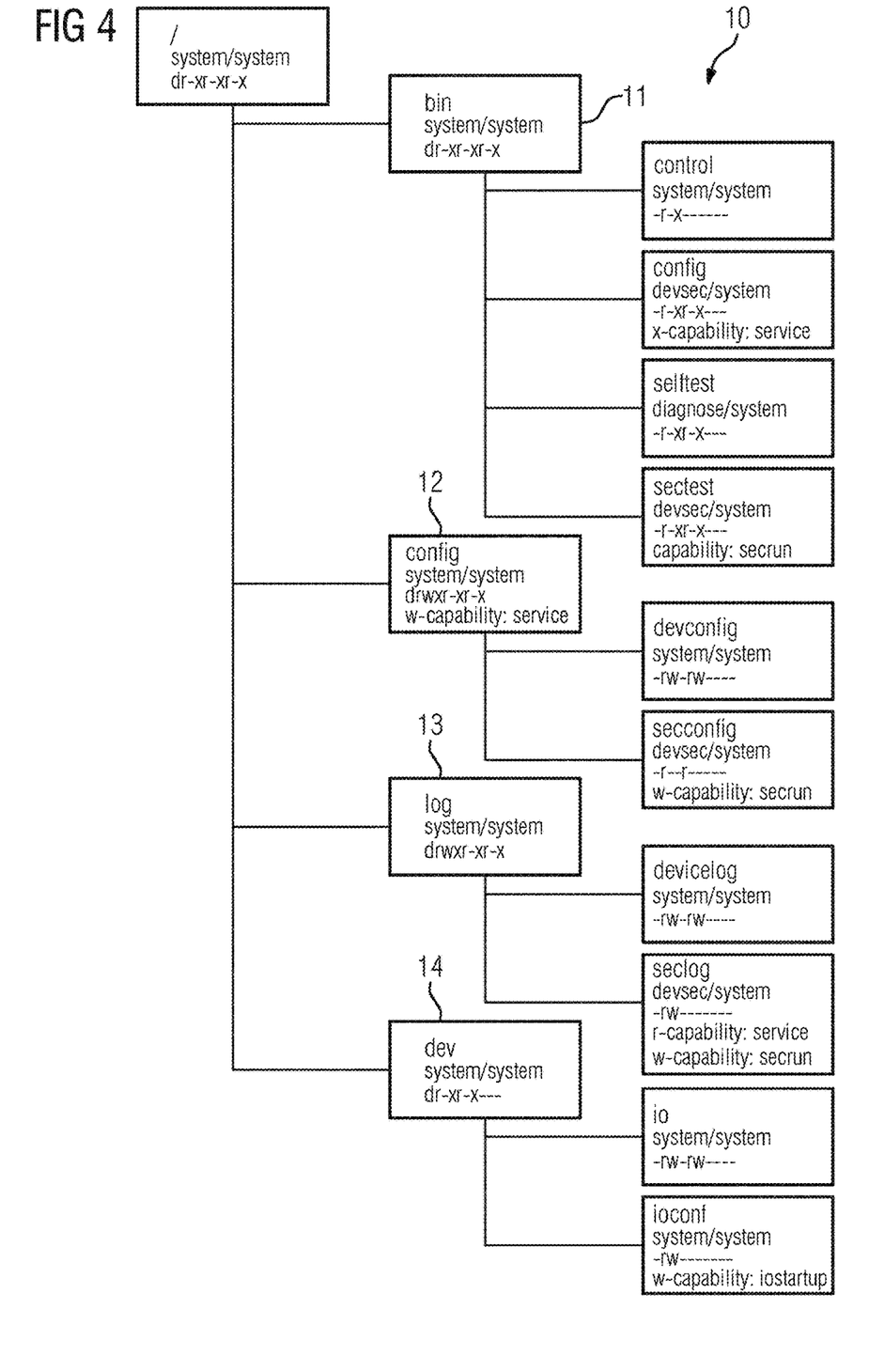
FIG. 4 shows a schematic diagram of an embodiment for a file system.

Hence, in act S1, an access control list is provided for the objects, e.g., for the files in the computerized system. For example, FIG. 4 shows a file system 10 including directories and files. FIG. 4 shows directories bin, config, log, and dev. The file system 10 is organized by the operating system of a computerized system. An example for an ACL entry may be seen in the bin directory 11. It is, for example, specified that access is granted according to the DAC attributes dr-xr-xr-x.

In addition to the ACL, capability requirement information is assigned to the files of the file system in act S2. Capability requirement information is, for example, a flag added to certain files in terms of an attribute that indicates that, for accessing the file, an additional capability check is necessary. Again referring to FIG. 4 in the bin directory 11, a config file having an ACL entry—r-xr-x--- carries an additional attribute "x-capability". "X-capability" may be regarded as a capability information indicative that, for accessing the config file in the bin directory 11, the user needs to have a matching capability information.

Thus, to each of the users, a capability information is assigned. If access to the config file in the bin directory 11 is requested by a user, act S3 requires a checking act as to whether the requesting user has an access right in accordance with the ACL and additionally has to have the capability information assigned to the user which matches with the capability requirement information assigned to the requested file. If this is not the case, the access is denied in act S4.

If the requesting user has the matching or compatible capability information assigned, the user may access the file in act S5.

Figure 2:
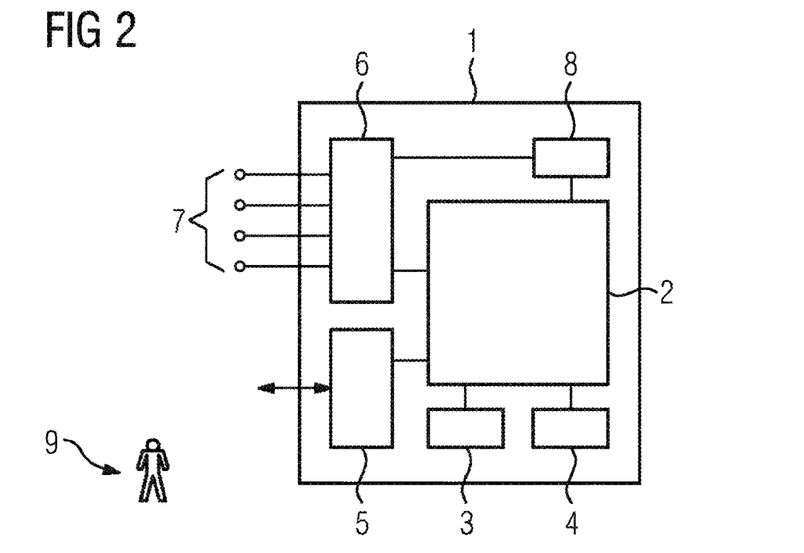
FIG. 2 shows a schematic diagram of an embodiment for a field device.
Figure 3:
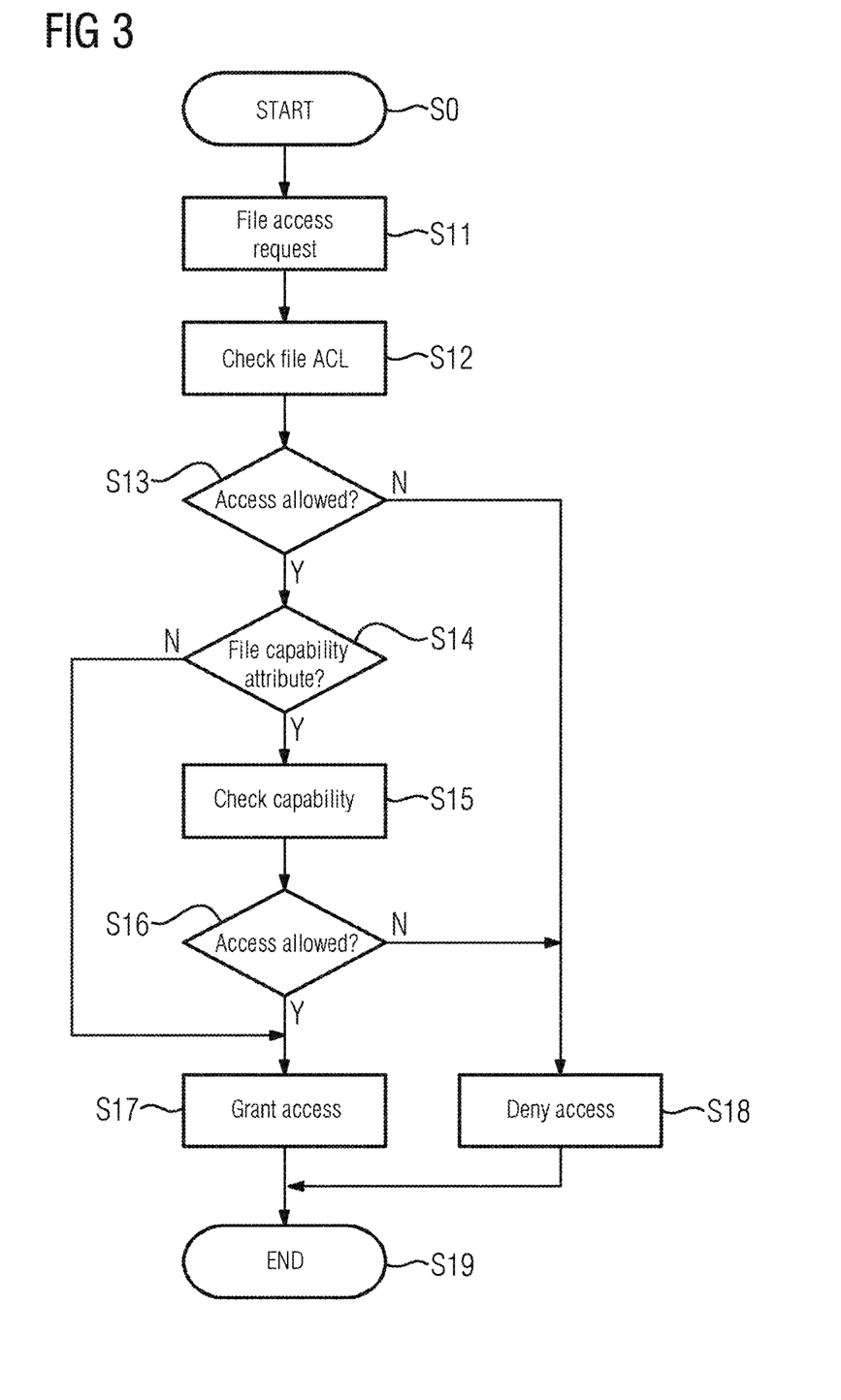
FIG. 3 shows a process flow including method acts involved in a further embodiment of a method for granting access to objects in a computerized system.

FIG. 2 shows a schematic diagram of an embodiment for a field device 1 that may be used and operated according to the method for granting or denying access to objects. FIG. 3 shows a process flow including method acts involved in a further embodiment of a method for granting access to such objects, in particular to files.

The field device 1 shown in FIG. 2 includes a processing device 2, as for example a central processing unit (CPU). There are memory devices 3 and 4 of which, for example, 3 is a random access memory (RAM) and 4 is a flash memory. The field device 1 has a network interface 5 and an input/output interface to couple with, for example, sensors or actuators 7 in an automation system. Further, the field device 1 includes a security element (SE) that is implemented as a hardware security module (HSM) that may be a secure element of a system on a chip.

In further embodiments, the field device 1 may include a trusted execution environment, a hardware crypto engine, a security guard extension SGX or an integrated trusted platform module TPM.

FIG. 2 further shows a user 9 as an example for an entity trying to access, for example, files and/or initiating processes to control the sensors 7.

The flash memory 4 for example stores an operational system, as for example Linux, BSD, or Windows. The RAM memory 4 also includes a file system as for example shown in FIG. 4. In certain embodiments, the file system 10 is copied into the RAM memory 3 upon a system start of the field device 1.

The operating system is implemented to carry out an ACL-based access control to the files. A respective ACL defines that user 9 of the operating system/field device 1 may have access to specific files of the file system 10. For example, the ACL defines particular types of users, for example, "web service", "control", "config", or "diagnose" users. For example, the ACL defines that only control users may have access to the I/O device 6. For other users, the access to the I/O interface device 6 may be blocked.

Referring again to the file system 10 shown in FIG. 4, a tree structure with directories bin 11, config 12, log 13, and dev 14 are shown that include several further subdirectories or files. For each file, an ACL is assigned according to known art. The ACL is written in terms of read (r), write (w), and execution rights (x) for a user or a user group. The files may have further attributes as, for example, "d" that designates a directory. For example, the directory log 13 is available for access according to the ACL entry drwxr-xr-x.

FIG. 3 shows a process flow for accessing a file in the file system 10. The process starts at act S0. In act S11, a user 9 requests access to a particular file. For example, the user 9 wants to access the file/bin/config in the bin directory 11.

In act S12, it is first checked if the user has an access right according to the respective ACL. If this is not the case, access is not allowed in act S13 so that the process stops with a denied access in acts S18 and S19, respectively.

The config file in the bin directory 11 also has capability requirement information in terms of a flag and/or capability requirement data. The capability requirement data entry in the config file reads x-capability: service. Hence, the config file may only be accessed if the requesting user has the service capability. According to the process flow in FIG. 3, first the operating system checks in act S14 if there is a file attribute indicating that a capability is necessary. For the config file the bin directory 11, this is the case. Hence, the capability is checked and verified in act S15.

If the user has an associated capability information in terms of a respective capability data entry CDE, the user may manipulate the file config and access is granted in act S17.

If an access request is directed to a file that does not have a capability attribute, as for example the control file in the bin directory 11, in act S14, no capability attribute check is necessary so that access is immediately granted in act S17.

In an analog fashion, other files, (e.g., executable files), may have an assigned capability requirement. For example, a security self-test application sectest in the bin directory 11 may only be run or accessed by a user if the user has the secrun capability. We note that the sectest ACL entry denies any change of the sectest program.

In connection with a denial or grant of access to the IO module 6 of the field device 1, the dev directory 14 requires the w-capability: iostartup. For example, "iostartup" implies that the process ioconfig may only be executed during a boot procedure of the device 1. For example, the iostartup capability may be used only once and expires after a first system start. This prevents that during the operation of the field device 1, a manipulation of the I/O module 6 occurs.

For example, the security element 8 may perform a verification of the capability assigned to the requesting user by calculating a cryptographic check sum. If the security element 8 verifies that the check sum is correct, (for example, of a user ID), configuration of the I/O interface 6 and thereby access to the sensor and actor devices 7 is allowed. This is, in particular, because the configurational file ioconf may only be read and written according to the ACL.

The capabilities assigned to a user or process may be hard-coded, for example, through a particular operating system kernel. Such hard-coded capabilities or capability data entries, respectively, have the advantage that they cannot be changed by users. However, in other embodiments, the list of capabilities in terms of a capability table including a user identifier and the assigned capability data entry may be stored in terms of a configurational file. For example, this may be implemented in terms of the config directory 12 in FIG. 4.

The integrity and robustness against unauthorized access may be improved for the field device in a computerized system. It is an advantage that a conventional operating system, such as Linux®, UNIX®, BSD, or Windows®, may be extended by a capability check for access-controlling files or processes. In particular, hardware-specific functions may be protected by particular capability requirements. Thus, the overall security of the computerized system is improved.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described with respect to certain embodiments, equivalents and modifications will occur to others skilled in the art upon the reading and understanding of the specification. The present disclosure includes all such equivalents and modifications and is limited only by the scope of the appended claims.

REFERENCE NUMERALS 1 field device
2 processing device
3 RAM memory device
4 flash memory device
5 network interface
6 input/output interface
7 sensor/actor devices
8 security element
9 user
10 file system
11-14 directory
S0 start
S1 provide ACL
S2 assign capabilities
S3 check ACL compliance
S4 deny access
S5 grant access upon successful capability check
S11 file access request
S12 check file ACL
S13 access allowed?
S14 file capability attribute?
S15 check capability
S16 access allowed?
S17 grant access
S18 deny access
S19 end

The invention claimed is:

1. A method for granting access to objects by entities in a computerized system, the method comprising:
providing an access control list specifying, for each object, access rights to the objects of the computerized system;
assigning a capability requirement information to at least one object of the objects in the access control list, wherein the capability requirement information comprises a capability requirement data entry, wherein the capability requirement data entry is implemented as part of header data of a file, a file attribute, a file name, a file name extension, or a combination thereof, and wherein the capability requirement information is a data flag in the access control list indicating a capability requirement, the capability requirement data entry, a pointer to the capability requirement data entry, or a combination thereof;
assigning a capability information to at least one entity of the entities in the computerized system;
requesting access to a requested object by a requesting entity, wherein the requested object is the file, a service, a registry entry, or a combination thereof;
checking when the requesting entity has an access right in accordance with the access control list;

verifying when a capability data entry of the requesting entity matches with the capability requirement data entry of the requested object; and granting access to the requested object by the requesting entity only when: (1) the capability information assigned to the requesting entity matches with the capability requirement information assigned to the requested object; and (2) the capability data entry of the requesting entity matches with the capability requirement data entry of the requested object.

2. The method of claim 1, wherein the requesting entity is a user or a process.

3. The method of claim 1, wherein the capability requirement data entry comprises a verification data entry for the verifying of the capability data entry of the requesting entity.

4. The method of claim 3, wherein the verifying of the capability data entry is executed using a separate secure element.

5. The method of claim 3, wherein the capability data entry comprises a cryptographic check sum calculated as a function of data indicative of an identity of the requesting entity,
wherein the verifying comprises a verification that the cryptographic check sum is correct, and
wherein access is granted based on whether the verification is correct.

6. The method of claim 1, wherein the capability information is an entry in a capability table comprising identifiers for the entities and assigned capability data entries, and
wherein the capability table is stored in a capability configuration file, a Linux security module, a secure element, a hardware security module, a security dongle, or a combination thereof.

7. The method of claim 6, wherein each capability data entry of the capability data entries has a limited period of validity.

8. The method of claim 1, wherein the computerized system comprises industrial personal computers, field devices, controller devices, or combinations thereof operated according to an operating system, and
wherein booting the computerized system comprises storing the capability information as a function of a random variable.

9. The method of claim 1, wherein the verifying comprises an identity check that a sequence of bits of the capability data entry of the requesting entity is identical with a same sequence of bits of the capability requirement data entry of the requested object, and
wherein the sequence of bits is randomly chosen.

10. The method of claim 1, wherein the verifying is performed only after confirming that the requesting entity has the access right in accordance with the access control list.

11. The method of claim 1, wherein the data flag in the access control list indicates that the capability requirement is to be checked prior to granting access.

12. The method of claim 1, wherein the capability requirement data entry is stored in a database separate from the access control list.

13. The method of claim 12, wherein the database comprises a trusted hardware module, a secure element, a cryptographically protected element, or a combination thereof.

14. A computer program product comprising a program code, wherein the program code, when executed on an industrial personal computer of a computerized system, is configured to cause the industrial personal computer to:

provide an access control list specifying, for each object, access rights to objects of the computerized system;
assign a capability requirement information to at least one object of the objects in the access control list, wherein the capability requirement information comprises a capability requirement data entry, wherein the capability requirement data entry is implemented as part of header data of a file, a file attribute, a file name, a file name extension, or a combination thereof, and wherein the capability requirement information is a data flag in the access control list indicating a capability requirement, the capability requirement data entry, a pointer to the capability requirement data entry, or a combination thereof;
assign a capability information to at least one entity of entities in the computerized system;
request access to a requested object by a requesting entity, wherein the requested object is the file, a service, a registry entry, or a combination thereof;
check when the requesting entity has an access right in accordance with the access control list;
verify when a capability data entry of the requesting entity matches with the capability requirement data entry of the requested object; and
grant access to the requested object by the requesting entity only when: (1) the capability information assigned to the requesting entity matches with the capability requirement information assigned to the requested object; and (2) the capability data entry of the requesting entity matches with the capability requirement data entry of the requested object.

15. A field device for an automation system, the field device comprising:
a processing device; and
a memory device for storing objects,
wherein the processing device is configured to:
provide an access control list specifying, for each object, access rights to objects in the access control list;
assign a capability requirement information to at least one object of the objects in the access control list, wherein the capability requirement information comprises a capability requirement data entry, wherein the capability requirement data entry is implemented as part of header data of a file, a file attribute, a file name, a file name extension, or a combination thereof, and wherein the capability requirement information is a data flag in the access control list indicating a capability requirement, the capability requirement data entry, a pointer to the capability requirement data entry, or a combination thereof;
assign a capability information to at least one entity of entities in the automation system;
request access to a requested object by a requesting entity, wherein the requested object is the file, a service, a registry entry, or a combination thereof;
check when the requesting entity has an access right in accordance with the access control list;
verify when a capability data entry of the requesting entity matches with the capability requirement data entry of the requested object; and
grant access to the requested object by the requesting entity only when: (1) the capability information assigned to the requesting entity matches with the capability requirement information assigned to the requested object; and (2) the capability data entry of the requesting entity matches with the capability requirement data entry of the requested object.

16. The field device of claim 15, wherein the memory device comprises a file system,
   wherein the objects in the access control list comprise files in the file system, and
   wherein the field device further comprises a separate memory device or section for storing and/or checking the capability information.

17. The field device of claim 15, further comprising a secure element.

* * * * *